United States Patent
Gowda

(10) Patent No.: US 10,204,430 B2
(45) Date of Patent: Feb. 12, 2019

(54) AIRCRAFT SYSTEMS AND METHODS WITH ENHANCED CPDLC MESSAGE MANAGEMENT

(71) Applicant: HONEYWELL INTERNATIONAL INC., Morris Plains, NJ (US)

(72) Inventor: Sushma Gowda, Karnataka (IN)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 233 days.

(21) Appl. No.: 14/931,082

(22) Filed: Nov. 3, 2015

(65) Prior Publication Data

US 2017/0124734 A1 May 4, 2017

(51) Int. Cl.
G08G 5/00 (2006.01)
G06T 11/20 (2006.01)
G06T 11/60 (2006.01)

(52) U.S. Cl.
CPC ............ *G06T 11/20* (2013.01); *G06T 11/60* (2013.01); *G08G 5/0013* (2013.01); *G08G 5/0021* (2013.01); *G08G 5/0039* (2013.01)

(58) Field of Classification Search
None
See application file for complete search history.

(56) References Cited

U.S. PATENT DOCUMENTS

| | | | |
|---|---|---|---|
| 6,313,759 B1 * | 11/2001 | Musland-Sipper | G08G 5/0013 340/945 |
| 6,542,796 B1 * | 4/2003 | Gibbs | G01C 23/005 244/183 |
| 6,922,631 B1 * | 7/2005 | Dwyer | G01C 23/00 340/971 |
| 8,335,988 B2 | 12/2012 | Fahy | |
| 8,694,184 B1 | 4/2014 | Boorman et al. | |
| 2005/0049762 A1 | 3/2005 | Dwyer | |

(Continued)

FOREIGN PATENT DOCUMENTS

| | | | |
|---|---|---|---|
| EP | 1322916 A2 | 7/2003 | |
| EP | 1756790 A2 | 2/2007 | |

(Continued)

OTHER PUBLICATIONS

ATC Data Link News; What is CPDLC? [Retrieved from Internet http://members.optusnet.com.au/~cjr/CPDLC.htm] Aug. 19, 2015.

(Continued)

*Primary Examiner* — Xiao M Wu
*Assistant Examiner* — Steven Z Elbinger
(74) *Attorney, Agent, or Firm* — Lorenz & Kopf, LLP

(57) ABSTRACT

An aircraft system includes a communications unit configured to receive a first message with a first proposed flight plan modification to a flight plan from air traffic control. The system further includes a processing unit coupled to the communications unit and configured to receive the first message. The processing unit is further configured to generate display commands representing the first proposed flight plan modification and the flight plan. The system further includes a display device coupled to the processing unit and configured to receive the display commands and display the flight plan and first symbology representing the first proposed flight plan modification with the flight plan.

15 Claims, 7 Drawing Sheets

(56) References Cited

U.S. PATENT DOCUMENTS

| | | | |
|---|---|---|---|
| 2009/0089693 A1* | 4/2009 | Fahy | G06F 17/243 |
| | | | 715/764 |
| 2010/0030401 A1 | 2/2010 | Rogers et al. | |
| 2010/0042633 A1* | 2/2010 | Gotlieb | G06F 9/546 |
| | | | 709/206 |
| 2010/0250026 A1 | 9/2010 | Deker et al. | |
| 2011/0137998 A1 | 6/2011 | Judd et al. | |
| 2013/0085661 A1* | 4/2013 | Chan | G05D 1/104 |
| | | | 701/122 |
| 2014/0253585 A1* | 9/2014 | Paul Dominic | B64D 45/00 |
| | | | 345/629 |
| 2014/0309821 A1* | 10/2014 | Poux | G08G 5/0021 |
| | | | 701/14 |
| 2015/0212701 A1 | 6/2015 | Rodney et al. | |
| 2016/0196750 A1* | 7/2016 | Collins | B64C 39/024 |
| | | | 701/14 |

FOREIGN PATENT DOCUMENTS

| | | |
|---|---|---|
| EP | 2159544 A1 | 3/2010 |
| EP | 2234087 A1 | 9/2010 |
| EP | 2778618 A2 | 9/2014 |
| EP | 2779139 A1 | 9/2014 |
| WO | 2005038748 A2 | 4/2005 |

OTHER PUBLICATIONS

Polson, P.G. et al.; The Cockpit Cognitive Walkthrough; ResearchGate; Aug. 18, 2015.
Extended EP Search Report for Application No. 16195187.6-1803 dated Jul. 3, 2017.

* cited by examiner

FIG. 8

| | | 810 LEG FUEL | 812 FUEL REM. | 814 GW |
|---|---|---|---|---|
| 801 — KPHX | 820 | | | |
| 802 — 274° HEC | FANS U74 | 8.51 lb | 11.5 lb | 67463 lb |
| 803 — 211° RESOR | | 0.32 lb | 11.2 lb | 67111 lb |
| 804 — 211° CIVET | | 0.28 lb | 10.9 lb | 66860 lb |

FIG. 8

| | | 910 LEG FUEL | 912 FUEL REM. | 914 GW |
|---|---|---|---|---|
| KPHX | | | | |
| HEC | | | | |
| RESOR | 920 | | | |
| 904 — 262° CIVET | FANS U74 | 0.40 lb | 11.1 lb | 66466 lbs |

FIG. 9

AIRCRAFT SYSTEMS AND METHODS WITH ENHANCED CPDLC MESSAGE MANAGEMENT

TECHNICAL FIELD

The present invention generally relates to aircraft systems and methods, and in particular, relates to aircraft systems and methods with enhanced controller pilot data link communication (CPDLC) message management.

BACKGROUND

Presently, most air traffic control systems around the world utilize voice communications to transmit various messages between air traffic controllers and pilots. The messages that are transmitted between air traffic controllers and pilots include, among other things, air traffic control clearances, various advisories, and aviation weather service, which help ensure coordination of aircraft movement and appropriate aircraft separation. In the commercial airline industry, communication between air traffic control ground stations and aircraft flight crews is evolving away from voice based communication towards electronic messaging. Controller pilot data link communications (CPDLC) systems are one example of a system providing a data link for air traffic control communications.

One disadvantage of CPDLC communications as compared to voice communications is that a pilot must divert attention away from the forward view of the aircraft in order to read CPDLC messages displayed on a screen. Responding to the CPDLC message requires further attention on the part of the pilot. This is particularly an issue as the number of CPDLC messages continues to increase.

Accordingly, it is desirable to provide systems and methods that improve management of the messages between air traffic control and an aircraft. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an aircraft system includes a communications unit configured to receive a first message with a first proposed flight plan modification to a flight plan from air traffic control. The system further includes a processing unit coupled to the communications unit and configured to receive the first message. The processing unit is further configured to generate display commands representing the first proposed flight plan modification and the flight plan. The system further includes a display device coupled to the processing unit and configured to receive the display commands and display the flight plan and first symbology representing the first proposed flight plan modification with the flight plan.

In accordance with another exemplary embodiment, a method includes receiving, via a communications unit, a first message with a first proposed flight plan modification to a flight plan in accordance with a controller pilot data link communication (CPDLC) standard; identifying, with a processing unit, a first flight plan element associated with the first proposed flight plan modification; and displaying, on a display device, the flight plan as a series of flight plan elements and first symbology representing the first proposed flight plan modification positioned proximate to the first flight plan element.

BRIEF DESCRIPTION OF THE DRAWINGS

The present invention will hereinafter be described in conjunction with the following drawing figures, wherein like numerals denote like elements, and wherein:

FIG. 8 is a flight plan list view generated on a display device with the system of FIG. 1 and method of FIG. 2 in accordance with a further exemplary embodiment;

FIG. 9 is a modified flight plan list view generated on a display device with the system of FIG. 1 and method of FIG. 2 in accordance with an exemplary embodiment.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments described herein provide aircraft systems and methods for managing aircraft communications, particularly CPDLC messages between air traffic control and the aircraft. More specifically, the systems and methods may be used to identify, evaluate, and present proposed flight plan modifications from CPDLC messages at the relevant position on the flight plan. Additionally, based on the operator response, exemplary embodiments automatically implement the modifications into a current flight plan and/or generate an appropriate response to air traffic control.

Figure 1:
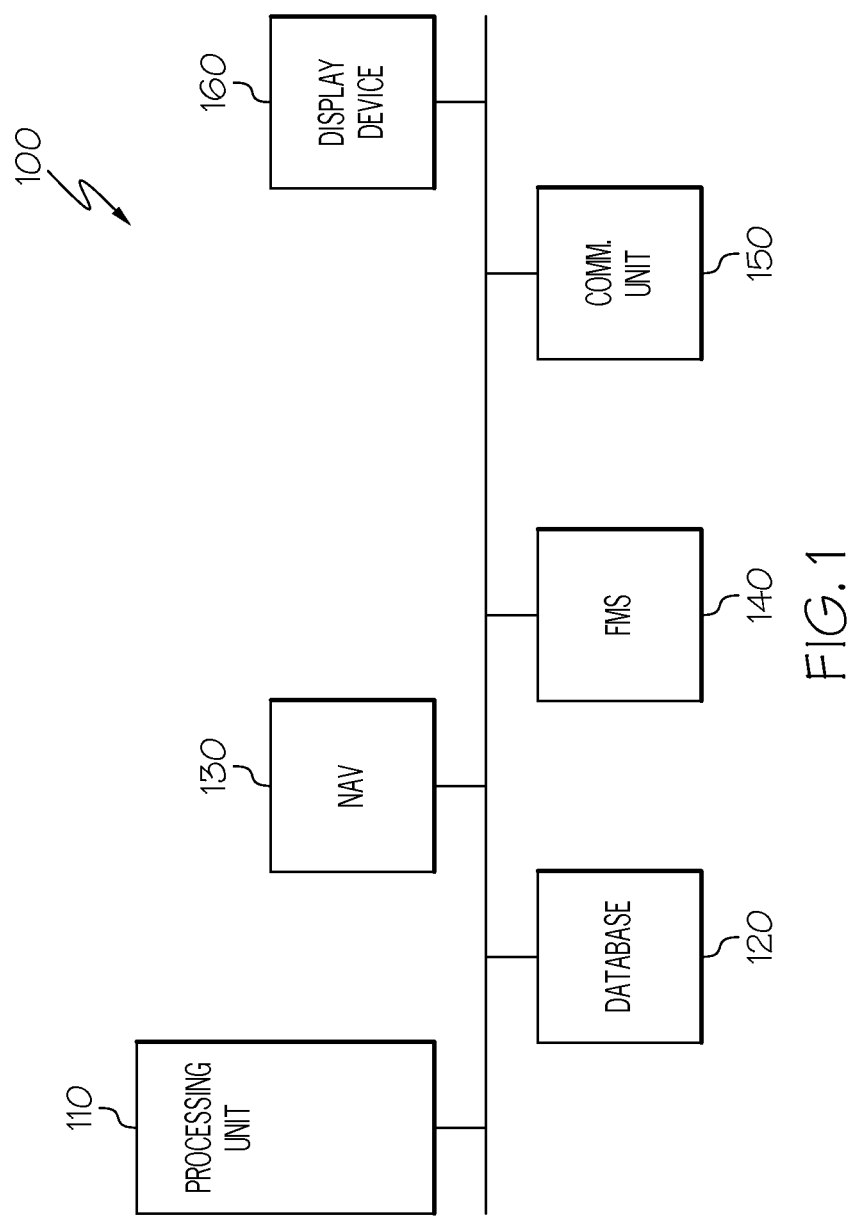
FIG. 1 is a functional block diagram of an aircraft system in accordance with an exemplary embodiment.

FIG. 1 is a block diagram of an aircraft system 100 in accordance with an exemplary embodiment. It should be understood that FIG. 1 is a simplified representation of the system 100 for purposes of explanation and ease of description. Further exemplary embodiments of the system 100 may include additional or other devices and components for providing further functions and features. The system 100 can be utilized in an aircraft, such as a helicopter, airplane, or unmanned vehicle. Moreover, exemplary embodiments of the system 100 can also be utilized in spacecraft, ships, submarines, and other types of vehicles, including land vehicles. For simplicity, exemplary implementations are described below with reference to "aircraft" and an "operator", which may include any user, pilot, flight crew member, and/or external control operator.

As shown in FIG. 1, the system 100 includes a processing unit 110, a database 120, a navigation system 130, a flight management system 140, a communications unit 150, and a display device 160 coupled together in any suitable manner, such with as a data bus. Although the system 100 appears in FIG. 1 to be arranged as an integrated system, the system 100 is not so limited and can also include an arrangement whereby one or more aspects of the system 100 are separate components or subcomponents of another system located either onboard or external to the aircraft. Additional details about the operation of the system 100 are provided below after a brief introduction of the components of the system 100.

The processing unit 110 may be a computer processor associated with any applicable aircraft system (e.g., including the flight management system 140 or a separate system). In one exemplary embodiment, the processing unit 110 functions to at least receive and/or retrieve aircraft management information (e.g., from the flight management system 140), navigation and control information (e.g., from the navigation system 130), and airport, landing, target and/or terrain information (e.g., from the database 120 and/or communications unit 150).

In some embodiments, among other functions and discussed in further detail below, the processing unit 110 may additionally calculate and generate display commands associated with the flight plan and/or flight or airport environment. As such, the processing unit 110 may function as a graphics display generator to generate display commands based on algorithms or other machine instructions stored in the processing unit 110 or in separate memory components. The processing unit 110 then sends the generated display commands to display device 160 for presentation to the operator, including the flight plan and navigation views discussed below. As also described below, the processing unit 110 additionally manages the receipt, display, and/or implementation of CPDLC message data with respect to the flight plan, including appropriate communications with air traffic control or other aircraft operators.

Depending on the embodiment, the processing unit 110 may be implemented or realized with a general purpose processor, a content addressable memory, a digital signal processor, an application specific integrated circuit, a field programmable gate array, suitable programmable logic device, discrete gate or transistor logic, processing core, discrete hardware components, or any combination thereof. In practice, the processing unit 110 includes processing logic that may be configured to carry out the functions, techniques, and processing tasks or methods associated with operation of the system 100. The computer readable instructions, firmware and software programs are tangibly embodied on any appropriate medium used for storage of computer readable instructions including, but not limited to, all forms of non-volatile memory, including, by way of example and not by limitation, semiconductor memory devices, such as EPROM, EEPROM, and flash memory devices; magnetic disks such as internal hard disks and removable disks; magneto-optical disks; and DVD disks.

Although not shown, the processing unit 110 may include a user interface coupled to the processing unit 110 to allow a user to interact with the display device 160 and/or other elements of the system 100. The user interface may be realized as a keypad, touchpad, keyboard, mouse, touch panel, joystick, knob, line select key or another suitable device adapted to receive input from a user. In some embodiments, the user interface may be incorporated into the display device 160, such as a touchscreen. In further embodiments, the user interface is realized as audio input and output devices, such as a speaker, microphone, audio transducer, audio sensor, or the like.

Database 120 is coupled to processing unit 110 and can be a memory device (e.g., non-volatile memory, disk, drive, tape, optical storage device, mass storage device, etc.) that stores digital airport, landing, waypoint, target location, and terrain data as either absolute coordinate data or as a function of aircraft position that enables the construction, maintenance, and modification of a flight plan and/or a synthetic or enhanced representation of the aircraft operating environment. Data in the database 120 may be uploaded prior to flight or received from external sources, such as an airport transmitter or onboard sensors.

The navigation system 130 is configured to provide the processing unit 110 with real-time navigational data and/or information regarding operation of the aircraft. The navigation system 130 may include or cooperate with a global positioning system (GPS), inertial reference system (IRS), Air-data Heading Reference System (AHRS), or a radio-based navigation system (e.g., VHF omni-directional radio range (VOR) or long range aid to navigation (LORAN)). The navigation system 130 is capable of obtaining and/or determining the current state of the aircraft, including the location (e.g., latitude and longitude), altitude or above ground level, airspeed, pitch, glide scope, heading, and other relevant flight or operational information.

The flight management system 140 supports navigation, flight planning, and other aircraft control functions, as well as provides real-time data and/or information regarding the operational status of the aircraft. The flight management system 140 may include or otherwise access one or more of the following: a weather system, an air traffic management system, a radar system, a traffic avoidance system, an autopilot system, an auto-thrust system, a flight control system, hydraulics systems, pneumatics systems, environmental systems, electrical systems, engine systems, trim systems, lighting systems, crew alerting systems, electronic checklist systems, an electronic flight bag, and/or other suitable avionics systems. As examples, the flight management system 140 may identify operating states of the aircraft, such as engine operation and current aircraft configuration status, including information regarding the current flap configuration, aircraft speed, aircraft pitch, aircraft yaw, aircraft roll, and the like. Additionally, the flight management system 140 may identify or otherwise determine environmental conditions at or near the current location of the aircraft, such as, for example, the current temperature, wind speed, wind direction, atmospheric pressure, and turbulence. The flight management system 140 may also identify optimized speeds, distance remaining, time remaining, cross track deviation, navigational performance parameters, and other travel parameters. Although not shown, the navigation system 130 and/or flight management system 140 may include one or more sensors such as light sensors, infrared sensors, radar, lidar, sonar, and/or weather sensors that may provide information to the system 100. In one exemplary embodiment, the flight management system 140 cooperates with other components of the system 100 to generate, maintain, and/or modify a flight plan, as described below.

The communications unit 150 may be any suitable device for sending and receiving information to and from the system 100. In some embodiments, communications unit 150 may be configured to receive radio frequency transmissions, satellite communication transmissions, optical transmissions, laser light transmissions, sonic transmissions or transmissions of any other wireless form of data link. In one exemplary embodiment, the communications unit 150 may include, for example, an automatic dependent surveillance-broadcast (ADSB) transceiver. In one exemplary embodiment, the communications unit 150 is configured to send and/or receive information from the airport and/or air traffic control. The processing unit 110 and/or communications unit 150 may include a communication management unit (CMU) to facilitate the sending and receipt of messages between the aircraft and air traffic control.

As described in greater detail below, the communications unit 150 may form part of various types of communication systems, and the processing unit 110 is configured to appropriately prepare and format messages associated with the various types of systems. As one example, the communications unit 150, processing unit 110, and display unit 160 may operate as part of a controller pilot data link communication (CPDLC) system that enables air traffic control to exchange messages with one or more aircraft over a data link. As used herein, a CPDLC message received from air traffic control may be referred to as an "uplinked" message, and a CPDLC message sent to air traffic control may be referred to as a "downlinked" message. In addition to air traffic control, the communications unit 150, processing unit 110, and display unit 160 may further operate to exchange messages with other aircraft operators in any suitable protocol or system according to the exemplary embodiments discussed herein.

Generally, CPDLC is a format or protocol of visual or text-based communications between an aircraft and air traffic control. For example, a CPDLC application implemented by the processing unit 110 may include a set of predefined message elements, which may correspond to voice phraseology typically employed by air traffic control procedures. The CPDLC system is capable of issuing many different types of messages, including level assignments, crossing constraints, lateral deviations, route changes and clearances, speed assignments, radio frequency assignments, and various requests for information that may be broadcast to every aircraft within a given range, a subset of the aircraft, or to a specific aircraft. Similarly, the CPDLC system enables the aircraft to respond to messages, to request clearances and information, to report information, and to declare/rescind an emergency. In addition to the predefined message elements, CPDLC messages may further include a "free text" portion that enables the exchange of information not conforming to defined formats. The CPDLC messages may be generated and formatted by the processing unit 110 and sent by the communications unit 150. The sent and/or received messages may be displayed to the aircraft operator on the display device 160.

The CPDLC messages may be transmitted over a Future Air Navigation Services (FANS) or Aeronautical Telecommunications Network (ATN). FANS uses an Aircraft Communications Addressing and Reporting System (ACARS) network for transmission of CPDLC messages, while ATN is a high speed digital network that may offer faster speed over traditional ACARS networks. Generally, the FANS ACARS and ATN networks use a direct datalink system for transmission of short messages between aircraft and air traffic control.

As particularly described below, the system 100 may send and receive CPDLC messages to air traffic control regarding modifications to the flight plan. Proposed modifications to the flight plan in a CPDLC message may have the following format: <Flight Plan Position Indicator> <Command>. A list of examples of such messages is provided below in Table 1, although other message types are possible.

TABLE 1

CPDLC Flight Plan Modifications

AT [time] CLIMB TO [level]
AT [position] CLIMB TO [level]
AT [time] DESCEND TO [level]
AT [position] DESCEND TO [level]
CLIMB TO REACH [level] BY [time]
CLIMB TO REACH [level] BY [position]
DESCEND TO REACH [level] BY [time]
DESCEND TO REACH [level] BY [position]
EXPECT TO CROSS [position] AT [level]
EXPECT TO CROSS [position] AT OR ABOVE [level]
EXPECT TO CROSS [position] AT OR BELOW [level]
EXPECT TO CROSS [position] AT AND MAINTAIN [level]
CROSS [position] AT [level]
CROSS [position] AT OR ABOVE [level]
CROSS [position] AT OR BELOW [level]
CROSS [position] AT AND MAINTAIN [level]
CROSS [position] BETWEEN [level] AND [level]
CROSS [position] AT [time]
CROSS [position] AT OR BEFORE [time]
CROSS [position] AT OR AFTER [time]
CROSS [position] BETWEEN [time] AND [time]
CROSS [position] AT [speed]
CROSS [position] AT OR LESS THAN [speed]
CROSS [position] AT OR GREATER THAN [speed]
PROCEED DIRECT TO [position]

The system 100 also includes the display device 160 coupled to the processing unit 110. The display device 160 may include any device or apparatus suitable for displaying various types of computer generated symbols and flight information discussed above. Using data retrieved (or received) from the operator, database 120, navigation system 130, flight management system 140, and/or communications unit 150, the processing unit 110 executes one or more algorithms (e.g., implemented in software) for determining the position of the various types of desired information on the display device 160. As noted above, the processing unit 110 then generates display commands representing this data, and sends display commands to the display device 160. As examples described in greater detail below, the display device 160 may display a flight plan list, a lateral view, a vertical situation view, and/or elements for operator interaction with the system 100 within the views.

In various exemplary embodiments, the rendered image may be a two-dimensional lateral view, a two-dimensional vertical profile view, or a three-dimensional perspective view. Any suitable type of display medium capable of visually presenting multi-colored or monochrome flight information for a pilot or other flight crew member can be provided, such as, for example, various types of CRT displays, LCDs, OLED displays, plasma displays, projection displays, HDDs, HUDs, and the like.

As described in greater detail below, during operation, the system 100 functions to receive CPDLC messages from air traffic control and display proposed flight plan modifications associated with the messages in a format relevant to the flight plan for consideration by the operator. Upon receiving input from the pilot, the system 100 incorporates the modifications into the flight plan in order to assist the aircraft operator and/or air traffic control with aircraft navigation and traffic management. A more detailed description of the operation of the system 100 is provided below with reference to FIG. 2.

Figure 2:
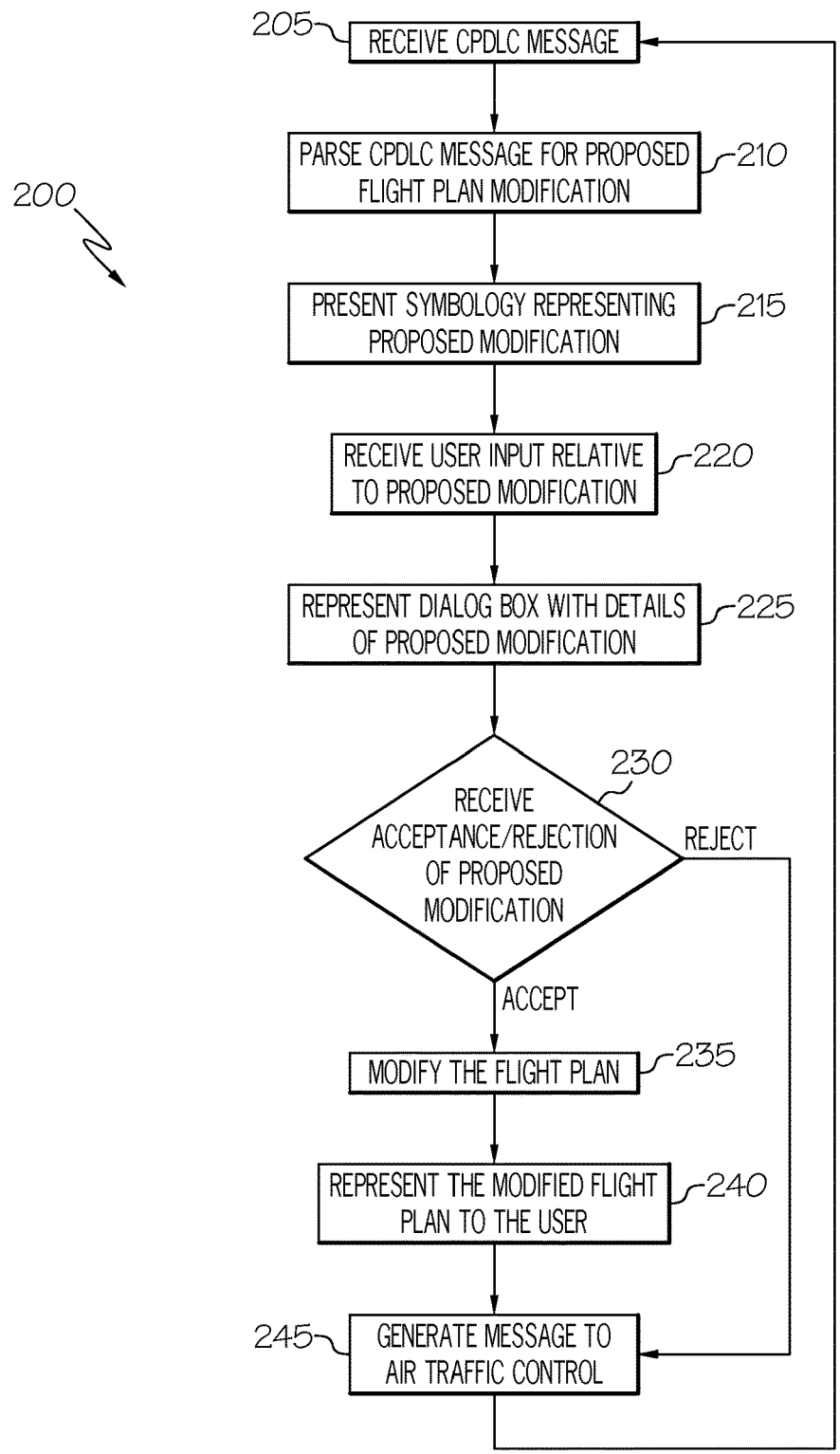
FIG. 2 is a flowchart of a method for managing CPDLC messages in accordance with an exemplary embodiment.

FIG. 2 is a flowchart of a method 200 for managing CPDLC messages. In one exemplary embodiment, the method 200 is implemented on an aircraft, although in other embodiments, the method 200 may be implemented from the perspective of an operator outside of the aircraft, such as air traffic control or an unmanned aircraft. As one example, the method 200 may be implemented by the system 100 of FIG. 1. As such, FIGS. 1 and 2 are referenced in the discussion below. It should be appreciated that method 200 may include any number of additional or alternative tasks, and the tasks shown in FIG. 2 need not be performed in the illustrated order.

In one exemplary embodiment, the method 200 may be implemented in the context of a current flight plan during aircraft operation. In general, a flight plan is a detailed description of the path to be followed by an aircraft during a scheduled flight. In particular, the flight plan is a chronological sequence of waypoints described by their name, their position, their altitude and the time they are overflown or sequenced. The presentation of the flight plan to an operator may take a number of forms, including a textual or tabular list of the type typically on an MDCU or a geographic depiction of the path, such as on a lateral or vertical situation view on a navigation display. Characteristics of the display and interaction with respect to the flight plan will be discussed in greater detail below.

In a first step 205, the system 100 receives a CPDLC message from air traffic control. In particular, the system 100 may receive the CPDLC message via the communications unit 150. As described above, in one exemplary embodiment, the CPDLC message may include a proposed modification to the intended operation of the aircraft that requires a modification to the current flight plan. Generally, CPDLC messages may be collectively viewed on a CPDLC log page or ATC log page as a list of numbered textual messages on an MCDU or other display device. As described below, in exemplary embodiments, the CPDLC messages that include a proposed modification to the current flight plan may also be displayed and processed according to the subsequent method steps.

In a second step 210, the system 100 parses the CPDLC message and identifies the relevant information, including the proposed modification, with respect to the current flight plan. As noted above, the processing unit 110 parses the CPDLC message to initially identify that the CPDLC message includes a proposed flight plan modification. As noted above, the CPDLC messages may include a time and/or position identifier that references or implicates one or more elements within the flight plan. As examples, the position identifier may be a waypoint identifier and/or latitude/longitude coordinates. Further, the processing unit 110 identifies the nature of the proposed modification at the respective flight plan element or elements.

In a third step 215, the system 100 presents symbology representing the proposed modification to the operator in a manner that references the flight plan element associated with the proposed modification. Generally, the proposed modification references and/or corresponds to an existing flight plan elements. However, in some exemplary embodiments, the proposed modification may correspond to a position in between existing flight plan elements. In such situations, the proposed modification may be considered to reference and/or correspond to a temporary or intermediate flight plan element. In some exemplary embodiments, the symbology may additionally provide information regarding the nature of the proposed flight plan modification. Further, the symbology may represent an interactive display element that enables an operator to view, accept, and/or reject the proposed modification. The presentation of the symbology may take various forms, as described below.

Figure 3:
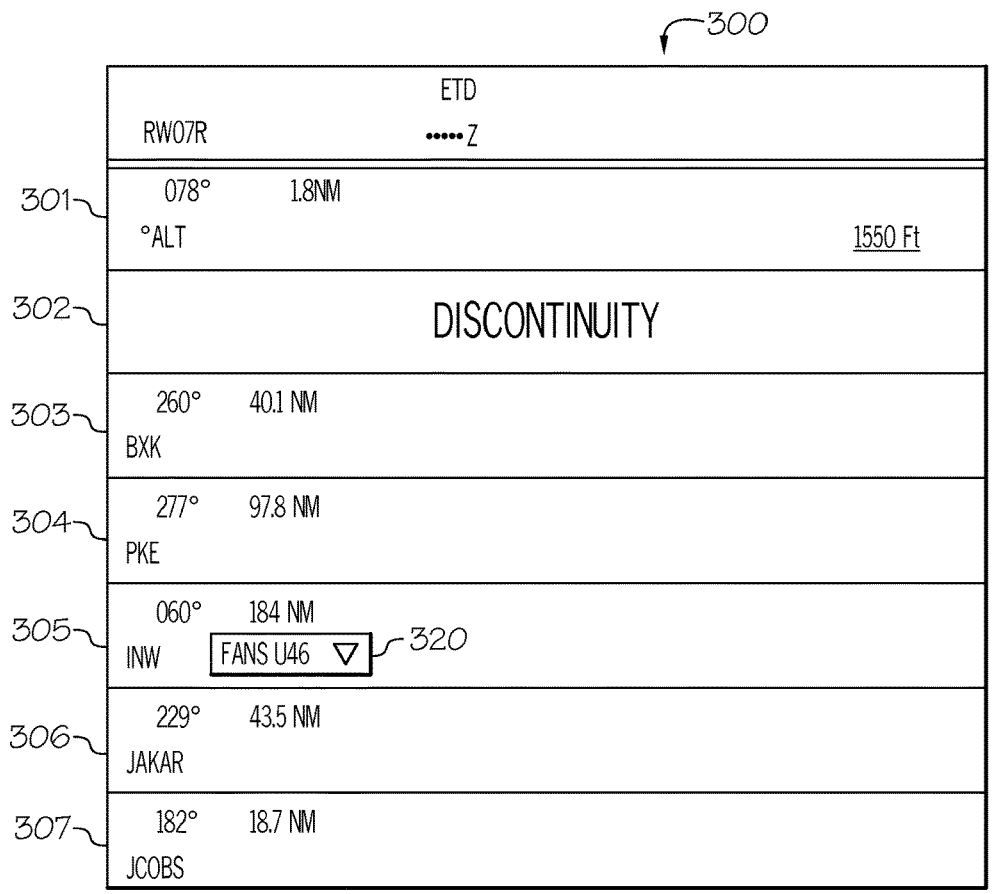
FIG. 3 is a flight plan list view generated on a display device with the system of FIG. 1 and method of FIG. 2 in accordance with an exemplary embodiment.

Reference is briefly made to FIG. 3, which is a flight plan view 300 generated by the system 100 on the display device 160 in accordance with an exemplary embodiment. The flight plan view 300 is generally a textual or tabular list of the flight plan elements 301-307 in chronological order. As shown, the flight plan elements 301-307 may correspond to waypoints 301, 303-307 or other types of navigational references, such as a discontinuity 302. As noted above, the flight plan view 300 is typically arranged in chronological order with the initial flight plan element 301 being the current position or waypoint. Each of the flight plan elements 303-307 corresponding to waypoints may include information associated with the waypoint, including the waypoint identifier (e.g., BXK, PKE, INW, JAKAR, JCOBS), a designated track, and the distance between waypoints.

As further depicted in FIG. 3, the flight plan view 300 includes symbology 320 representing the proposed flight plan modification from the CPDLC message. In this exemplary embodiment, the symbology 320 is positioned on or proximate to flight plan element 305, thereby indicating that the proposed flight plan modification is associated with the respective waypoint (e.g., INW). As noted above, if the proposed flight plan modification corresponds to a temporary or intermediate flight plan element, the flight plan view 300 may include the temporary flight plan element inserted in between the current flight plan elements.

In addition to the relevant position, the symbology 320 may include one or more characteristics to provide further information about the proposed modification. For example, symbology 320 includes the text "FANS", which indicates that the CPDLC message was received over the FANS network, and the text "U46", which identifies the particular CPDLC message (e.g., uplinked message number 46). As such, this symbology 320 enables immediate differentiation between CPDLC message received from disparate sources. Further, the symbology 320 may represent an interactive user input element (or widget) that enables further action or presentation of information upon selection by the operator. As such, the symbology 320 may include one or more graphic features that indicate the interactive nature. For example, the symbology 320 includes a downwardly pointing arrow or caret that indicates additional information or action may be available, e.g., by selecting or clicking on the symbology 320.

Returning to FIG. 2, in a further step 220, the system 100 receives input from the operator relative to the proposed modification. As referenced above, the input may include the operator selecting or "clicking" on the symbology 320 of FIG. 3 with a cursor control device (e.g., via a touchscreen element, mouse, etc.). Upon receiving the operator input (e.g., upon selection of the symbology 320), the method 200 proceeds to step 225.

Figure 4:
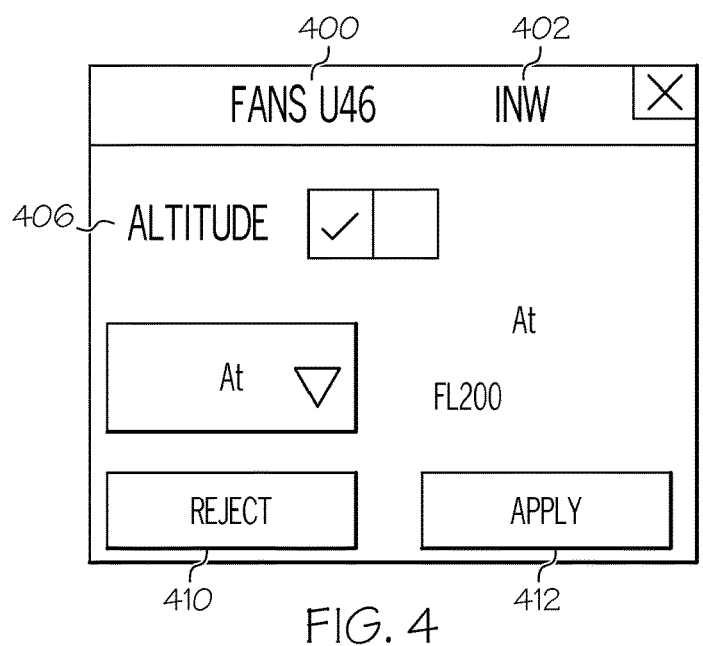
FIG. 4 is a dialog box generated on a display device with the system of FIG. 1 and method of FIG. 2 in accordance with an exemplary embodiment.

In step 225, the system 100 presents a dialog (or pop-up) box to the operator in order to provide details regarding the proposed modification and enable operator acceptance or rejection. Reference is briefly made to FIG. 4, which is an example of a dialog box 400 resulting from the selection of symbology 320 of FIG. 3. As stated above, the dialog box 400 generally presents the nature of the proposed modification associated with the CPDLC message. In one exemplary embodiment, the dialog box 400 is presented over or on the flight plan view 300, although other arrangements may be provided. As shown, the dialog box 400 includes an identification of the relevant waypoint 402, identification of the CPDLC message 404, and one or more elements that describe the proposed modification 406. In this particular scenario, CPDLC message "FANS U46" proposes that the aircraft cross waypoint INW at FL200, and as such, the proposed modification 402 in the dialog box 400 states that the altitude at INW should be FL200. The dialog box 400 also includes interactive buttons 410, 412 to accept operator input to reject or accept the proposed modification.

In one exemplary embodiment, step 225 may be omitted and/or combined with step 220 in that the proposed modification may be rejected or accepted via the symbology on the flight plan view list. As one example, double-clicking (or other type of operator input) may indicate acceptance such that a separate dialog box is unnecessary. Similarly, the symbology may include sub-elements that enable rejection (e.g., an "X" within the symbology) and/or acceptance (e.g., a check mark or other affirmative element).

Figures 5, 6:
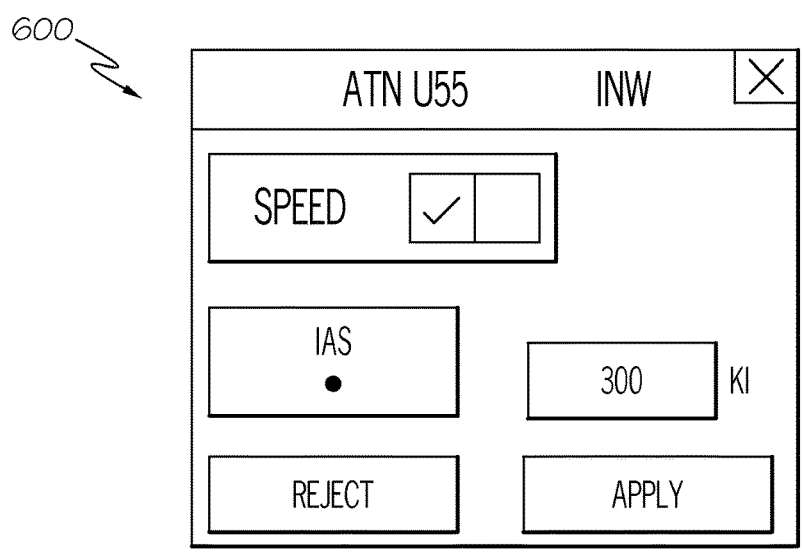
FIG. 5 is a flight plan list view generated on a display device with the system of FIG. 1 and method of FIG. 2 in accordance with a further exemplary embodiment.
FIG. 6 is a dialog box generated on a display device with the system of FIG. 1 and method of FIG. 2 in accordance with a further exemplary embodiment.

FIGS. 3 and 4 provide an example of one type of proposed flight plan modification resulting from a CPDLC message. Any type of message and proposed flight plan modification may be provided. An additional type is depicted by FIGS. 5 and 6. In particular, FIG. 5 is a flight plan view 500 generated on the display device 160 with a list of flight plan elements 501-507 similar to that of FIG. 3. However, in FIG. 5, symbology 520 labeled "ATN U55" is depicted on the appropriate flight plan location, thereby indicating that the CPDLC message originated from ATN and is designated as uplinked message U55. Upon selection of symbology 520, the dialog (or pop-up) box 600 of FIG. 6 is presented to the operator. In this embodiment, the box 600 provides information associated with the flight plan modification. In this particular example, message U55 is a speed constraint of 300 knots at waypoint INW.

Returning to FIG. 2, in step 230, the system 100 receives further input from the operator in the form of acceptance or rejection of the proposed modification. Examples of mechanisms by which the operator may accept or reject the proposed modification are discussed above. If the operator rejects the proposed modification in step 230, the method 200 proceeds to step 245, described below. If the operator accepts the proposed modification in step 230, the method 200 proceeds to step 235. In one exemplary embodiment, the system 100 considers a predetermined delay in operator input (e.g., no response or no operator input) to be a rejection of the proposed flight plan modification.

In step 235, the system 100 modifies the flight plan in accordance with the proposed modification from the CPDLC message, and in step 240, the system 100 presents the modified flight plan to the operator. In particular, the processing unit 110 may modify the flight plan via the flight management system 140 and present the modified flight plan on the display device 160.

Figure 7:
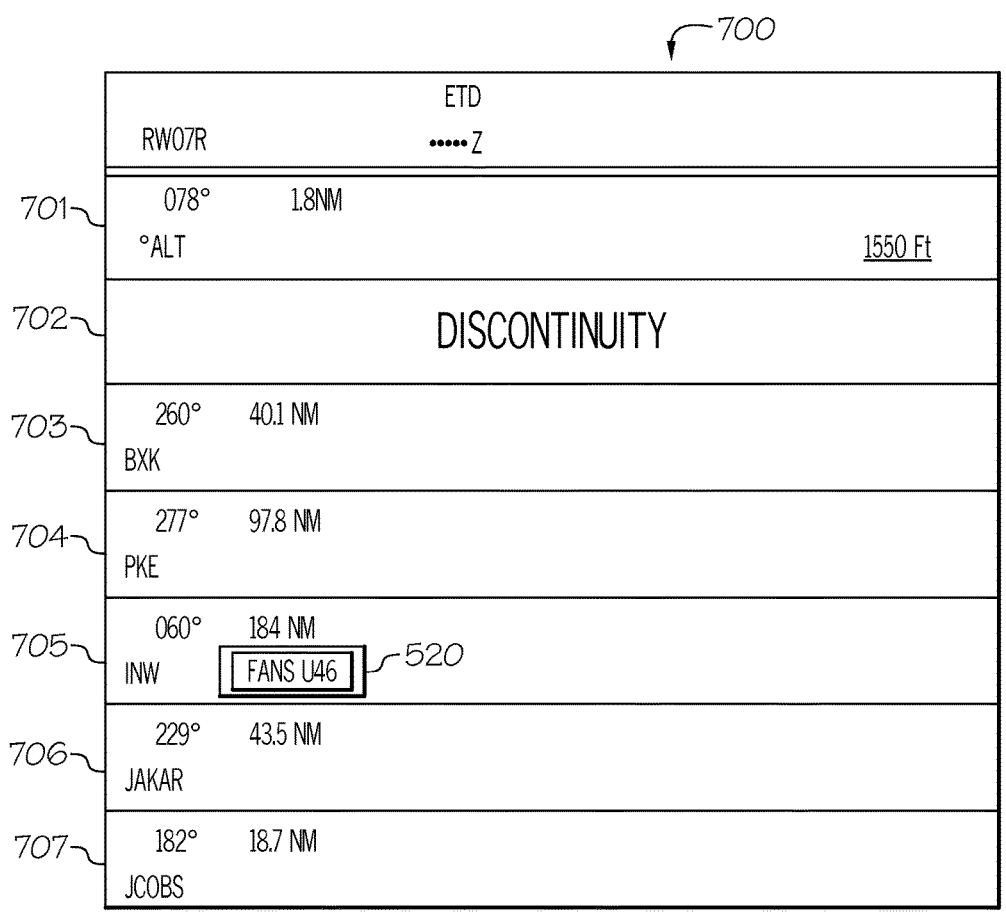
FIG. 7 is a modified flight plan list view generated on a display device with the system of FIG. 1 and method of FIG. 2 in accordance with an exemplary embodiment.

As one example, FIG. 7 is a flight plan view 700 with flight plan elements 701-706, including the flight plan element 705 that reflects the modification (e.g., "FANS U46") discussed above with reference to FIGS. 3 and 4. In one exemplary embodiment, the modified flight plan element 705 may be highlighted (e.g., in a different color, underlined, or bolded) relative to other flight plan elements to more clearly depict the modified element.

In one exemplary embodiment, the modified flight plan view, such as that in FIG. 7, enables the operator to immediately visualize the changes on overall flight plan (both vertically and laterally), on flight plan performance parameters (distance to go, estimated time enroute, estimated time of arrival, fuel remaining, GS, leg fuel, gross weight, wind direction/speed, OAT, ISA, flight path angle, altitude), and on flight plan position parameters (latitude, longitude, mag. var.) at that point in comparison to previous flight plan due to uplink flight modification message. A brief example of modified performance parameters is provided with reference to FIGS. 8 and 9.

FIG. 8 is a flight plan view 800 generated by the system 100 on the display device 160 in accordance with an exemplary embodiment. The flight plan view 800 includes a list of the flight plan elements 801-804 in chronological order with flight plan element 802 (HEC) as the active waypoint similar to the views discussed above in FIGS. 3 and 5. In this exemplary embodiment, the flight plan view 800 includes performance parameters for each flight plan element 801-804 in the form of leg fuel 810, fuel remaining 812, and gross weight 814. The performance parameters, position parameters, and other parameters that are displayed may be selected from a display menu (not shown). As additionally shown in FIG. 8, the flight plan view 800 includes symbology 820 representing a proposed flight plan modification from a CPDLC message (e.g., FANS U74). In this instance, the CPDLC message is instructing the operator to proceed directly from the current position to waypoint CIVET (flight plan element 804). Upon selection and acceptance of the CPDLC message, similar to the mechanism described above, the system 100 will modifies the flight plan as shown in FIG. 9.

FIG. 9 is a flight plan view 900 generated by the system 100 on the display device 160 in accordance with an exemplary embodiment subsequent to accepting the proposed flight plan modification shown in FIG. 8. In accordance with the modification, the flight plan view 900 depicts flight plan element 904 (CIVET) as the active flight plan element. As shown, the leg fuel 910, fuel remaining 912, and gross weight 914 have been updated to reflect the performance parameters of the modified flight plan. For example, since the flight plan has been modified, the fuel remaining at waypoint CIVET has been increased from 10.9 lbs to 11.1 lbs. The flight plan view 900 of FIG. 9 may additionally include symbology 920 reflecting the flight plan element 904 that has been impacted by the flight plan modification.

Returning to FIG. 2, in step 245, the system 100 generates a message to air traffic control in response to the CPDLC message. If, in step 230, the operator rejected the proposed modification, the processing unit 110 generates and sends a message via the communications unit 150 to air traffic control indicating the rejection. However, if in step 230, the operator accepted the proposed modification, the processing unit 110 generates and sends a message via the communications unit 150 to air traffic control indicating acceptance and implementation of the proposed modification. This message may be automatically sent by the system 100 or presented to the operator for approval prior to sending.

Figure 10:
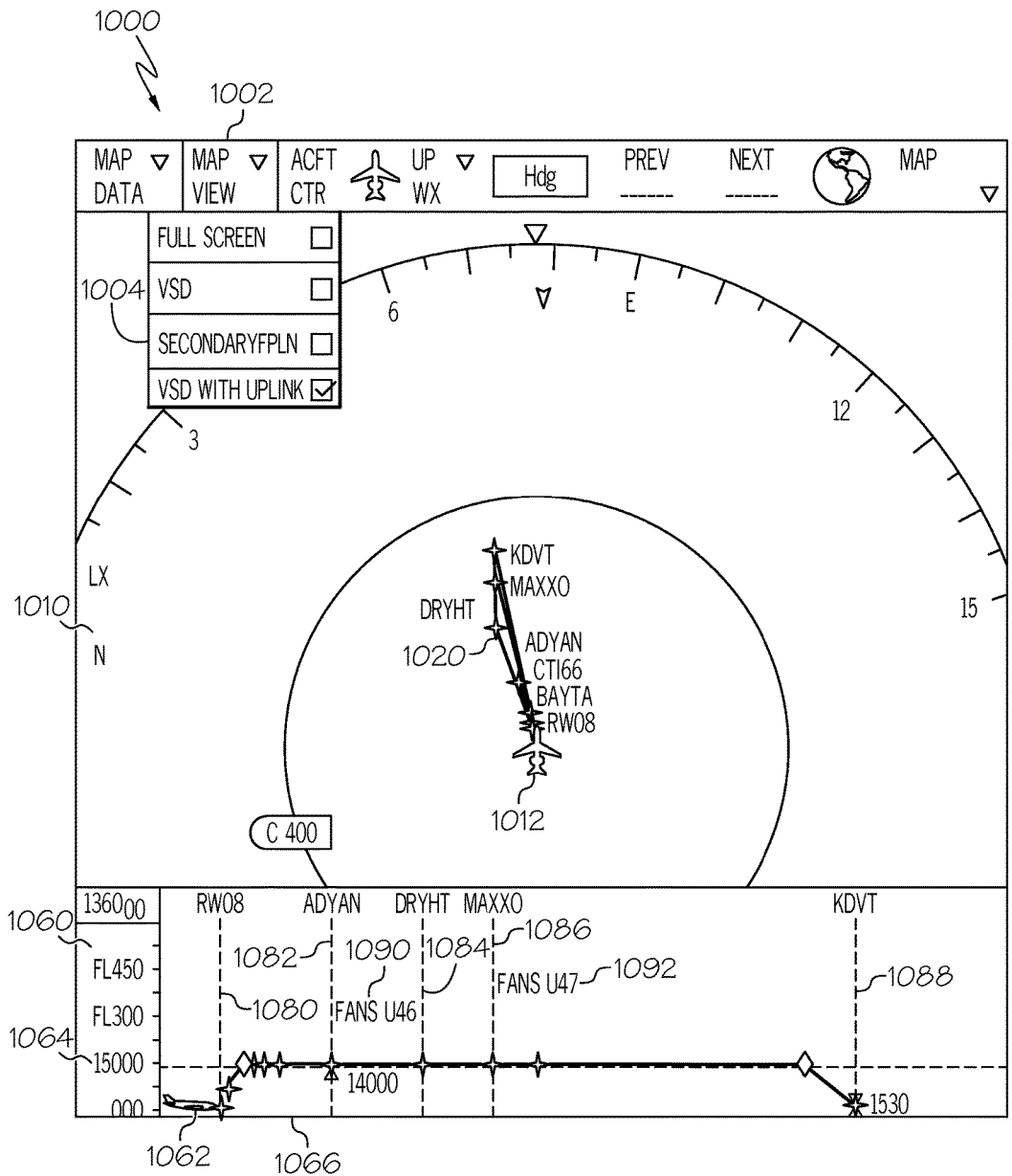
FIG. 10 is a visual display generated on a display device with the system of FIG. 1 and method of FIG. 2 in accordance with an exemplary embodiment.

In the description above (e.g., step 215), presentation of the proposed modification was provided in the context of a textual flight plan list. However, in other exemplary embodiments, the proposed modification may be presented in different contexts. For example, FIG. 10 is a visual display 1000 generated by the system 100 of FIG. 1 in accordance with an exemplary embodiment. In the depicted embodiment, the visual display 1000 is a navigation display that shows, among other things, computer generated symbols representing a lateral situation display view (or map view) 1010 and a vertical situation display view (or elevation view) 1060.

The lateral situation display view 1010 is generally a top-down view of the aircraft environment and includes graphical symbols representing the position of the aircraft 1012 relative to the lateral flight plan 1020 formed by lateral segments between waypoints. The vertical situation display view 1060 is generally a side or elevation view of the aircraft environment and is generally synchronized with the positional view on the lateral situation display view 1010. As such, the vertical situation display view 1060 includes graphical symbols representing the position of the aircraft 1062 relative to altitude 1066, indicated on a vertical scale, and distance 1068, indicated on a horizontal scale. The vertical situation display view 1060 further depicts the vertical flight plan 1070 formed by vertical segments between waypoints (e.g., labeled waypoints 1080, 1082, 1084, 1086, 1088).

Moreover, the vertical situation display view 1060 may additionally depict symbology 1090, 1092 representing proposed flight plan modifications associated with CPDLC messages. As shown, the symbology 1090, 1092 is presented in a position corresponding to the relevant waypoint, which is this exemplary scenario is waypoint 1082 and waypoint 1086. Generally, the symbology 1090, 1092 is similar to the symbology 320, 520 discussed above with reference to FIGS. 3 and 5. As such, selection of the symbology 1090, 1092 will result in a dialog box (not shown) for evaluation and acceptance or rejection of the proposed flight plan modification.

In one exemplary embodiment, the display of the symbology associated with proposed flight plan modifications from CPDLC messages may be activated or deactivated by the operator. In particular, the visual display 1000 may include a menu 1002 in which display features may be modified. For example, menu 1002 includes a selection box 1004 that enables activation (e.g., by selecting or checking the box) for display of the symbology or de-activation (e.g., by selecting or unchecking the box) for removing the display of the symbology.

Accordingly, exemplary embodiments discussed herein provide improved management of CPDLC messages, including the consideration and implementation of the information contained therein. In particular, exemplary embodiments improve the management of CPDLC messages to enable modification of the flight plan in response to a respective CPDLC message directly on the flight plan views. Providing this information within the flight plan that immediately provides a context to the proposed flight plan modifications. This enables modifications to the flight plan to be more quickly implemented and displayed to the operator to highlight the modification in the context of the flight plan. In effect, the exemplary embodiments discussed herein integrate flight plan management and CPDLC communications in a particularly quick, intuitive, and efficient interface(s) that may otherwise require a number of different screens and tasks to review and implement corresponding functions. In particular, exemplary embodiments increase situational awareness and decrease errors, workload, and head-down time. Exemplary embodiments may not require additional communication hardware or protocols in that exemplary embodiments may use CPDLC messages and/or existing networks. Exemplary embodiments may provide more reliable and faster transmissions of proposed flight plan modifications and responses, thereby enabling more reliable and faster management of airport traffic Embodiments of the present invention may be described in terms of functional block diagrams and various processing steps. It should be appreciated that such functional blocks may be realized in many different forms of hardware, firmware, and or software components configured to perform the various functions. For example, embodiments of the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft system, comprising:
   a communications unit configured to receive a plurality of controller pilot data link communication (CPDLC) messages in accordance with a CPDLC standard, including a first message with a first proposed flight plan modification associated with a first flight plan element of a flight plan from air traffic control;
   a processing unit coupled to the communications unit and configured to receive the plurality of CPDLC messages, parse the plurality of CPDLC messages to determine which of the plurality of CPDLC messages references the flight plan, and collectively store the plurality of CPDLC messages as a list of numbered textual messages for display on a log page according to an individual message number referencing each respective message of the plurality of CPDLC messages within the CPDLC standard, wherein the processing unit, upon receipt of the first message, is configured to parse the first message, and to identify the reference to the flight plan as a time or position identifier associated with the first flight plan element for the first proposed flight plan modification from the first message, the processing unit further configured to generate display commands representing the first proposed flight plan modification and the flight plan; and
   a display device coupled to the processing unit and configured to receive the display commands and display the flight plan and first symbology representing the first proposed flight plan modification with the flight plan,
   wherein the display device is configured to display the flight plan as a series of flight plan elements as a textual list with the first symbology positioned proximate to the first flight plan element,
   wherein the display device is configured to display the first symbology as a first interactive user input element within the textual list of the displayed flight plan that enables further action or presentation of information upon selection by a user, the first symbology further including the individual message number from the first message on the log page of the plurality of CPDLC messages.

2. The aircraft system of claim 1, wherein the processing unit is configured to receive user input associated with the first symbology via the first interactive user input element and to generate the display commands such that, upon receiving the user input, the display device displays a dialog box with information corresponding to the first proposed flight plan modification.

3. The aircraft system of claim 2, wherein the dialog box includes additional interactive user input elements for user acceptance and rejection of the first proposed flight plan modification.

4. The aircraft system of claim 1, wherein the display device is configured to display the first symbology with a CPDLC network identifier as part of the individual message number.

5. The aircraft system of claim 4, wherein communications unit is configured to receive the first message over a Future Air Navigation Services (FANS) network or Aeronautical Telecommunications Network (ATN), and the display device is configured to display the first symbology with the CPDLC network identifier as the FANS network or ATN.

6. The aircraft system of claim 1, wherein, upon acceptance of the first proposed flight plan modification, the display device is configured to display the first flight plan element as highlighted.

7. The aircraft system of claim 1, wherein the display device is configured to selectively display the first symbology based on user input.

8. The aircraft system of claim 1, wherein, upon acceptance of the first proposed flight plan modification, the display device is configured to display the first flight plan element with an updated performance parameter.

9. The aircraft system of claim 1, wherein the processing unit is configured to parse the first message with a format <Flight Plan Position Indicator> <Command> as the first proposed flight plan modification.

10. The aircraft system of claim 1, wherein the processing unit is configured to receive an operator input associated with activating and deactivating the display of the first symbology on the display device, the processing unit configured to generate the display commands based on the operator input.

11. A method comprising:
receiving, via a communications unit, a plurality of controller pilot data link communication (CPDLC) messages in accordance with a CPDLC standard, including a first message with a first proposed flight plan modification associated with a first flight plan element of a flight plan in accordance with a controller pilot data link communication (CPDLC) standard;
parsing, with a processing unit, the plurality of CPDLC messages to determine which of the plurality of CPDLC messages references the flight plan;
collectively storing the plurality of CPDLC messages as a list of numbered textual messages for display on a log page according to an individual message number referencing each respective message of the plurality of CPDLC messages within the CPDLC standard,
wherein the parsing with the processing unit includes parsing the first message and identifying the reference to the flight plan as a time or position identifier associated with the first flight plan element for the first proposed flight plan modification within the first message; and
displaying, on a display device, the flight plan as a series of flight plan elements and first symbology representing the first proposed flight plan modification positioned proximate to the first flight plan element,
wherein the displaying steps includes displaying the series of flight plan elements as a vertical situation display with first symbology that includes the individual message number of the first message on the log page of the plurality of CPDLC messages.

12. The method of claim 11, wherein the displaying step includes displaying the first symbology as a first interactive user input element, and upon user input via the first interactive user input element, displaying a dialog box with information corresponding to the first proposed flight plan modification, the dialog box including additional interactive user input elements for user acceptance and rejection of the first proposed flight plan modification.

13. The method of claim 11, wherein the receiving step includes receiving the first message over a Future Air Navigation Services (FANS) network or Aeronautical Telecommunications Network (ATN), and wherein the displaying step includes displaying the first symbology with a CPDLC network identifier as part of the individual message number representing the FANS network or ATN.

14. The method of claim 11, further comprising receiving acceptance from a user of the first proposed flight plan modification, and
upon acceptance of the first proposed flight plan modification, displaying the first flight plan element within the flight plan as highlighted.

15. The method of claim 11, further comprising receiving acceptance from a user of the first proposed flight plan modification, and
upon acceptance of the first proposed flight plan modification, displaying the first flight plan element with an updated performance parameter.

* * * * *